March 19, 1963 A. G. BIZARD 3,081,876
FILTER
Filed Oct. 6, 1959 4 Sheets-Sheet 1
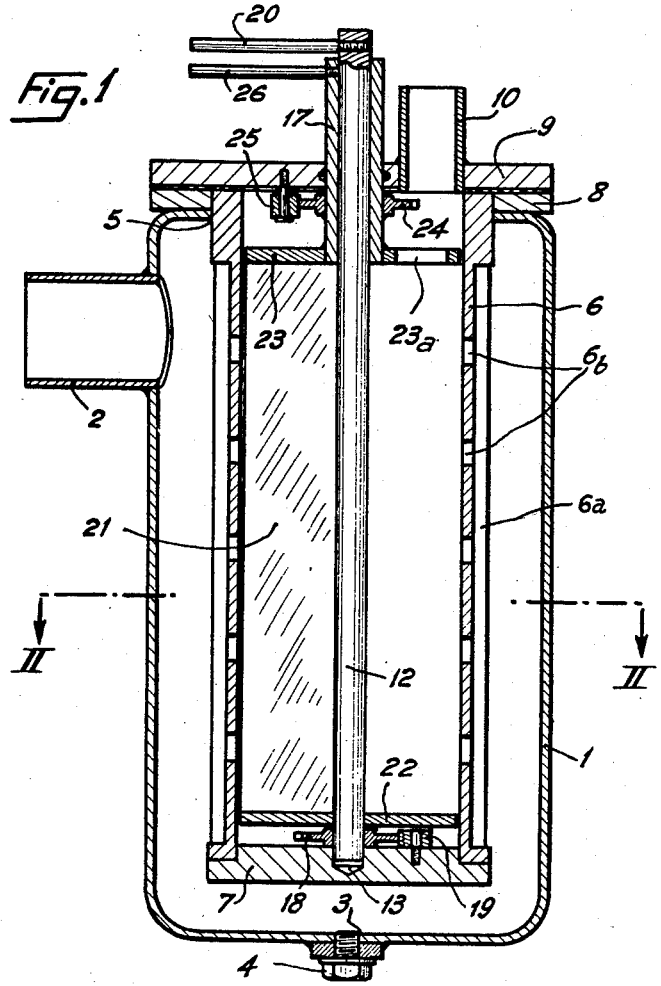
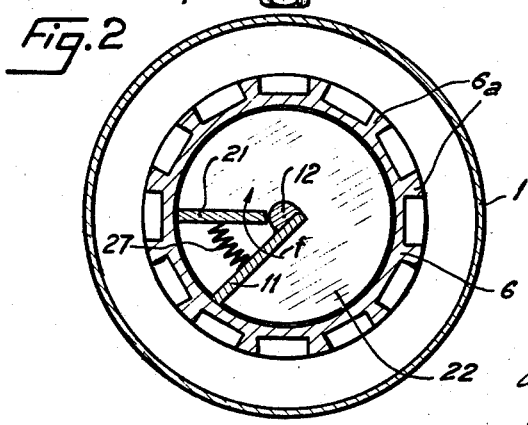
Inventor:
André G. Bizard
by Robert Henderson
attorney

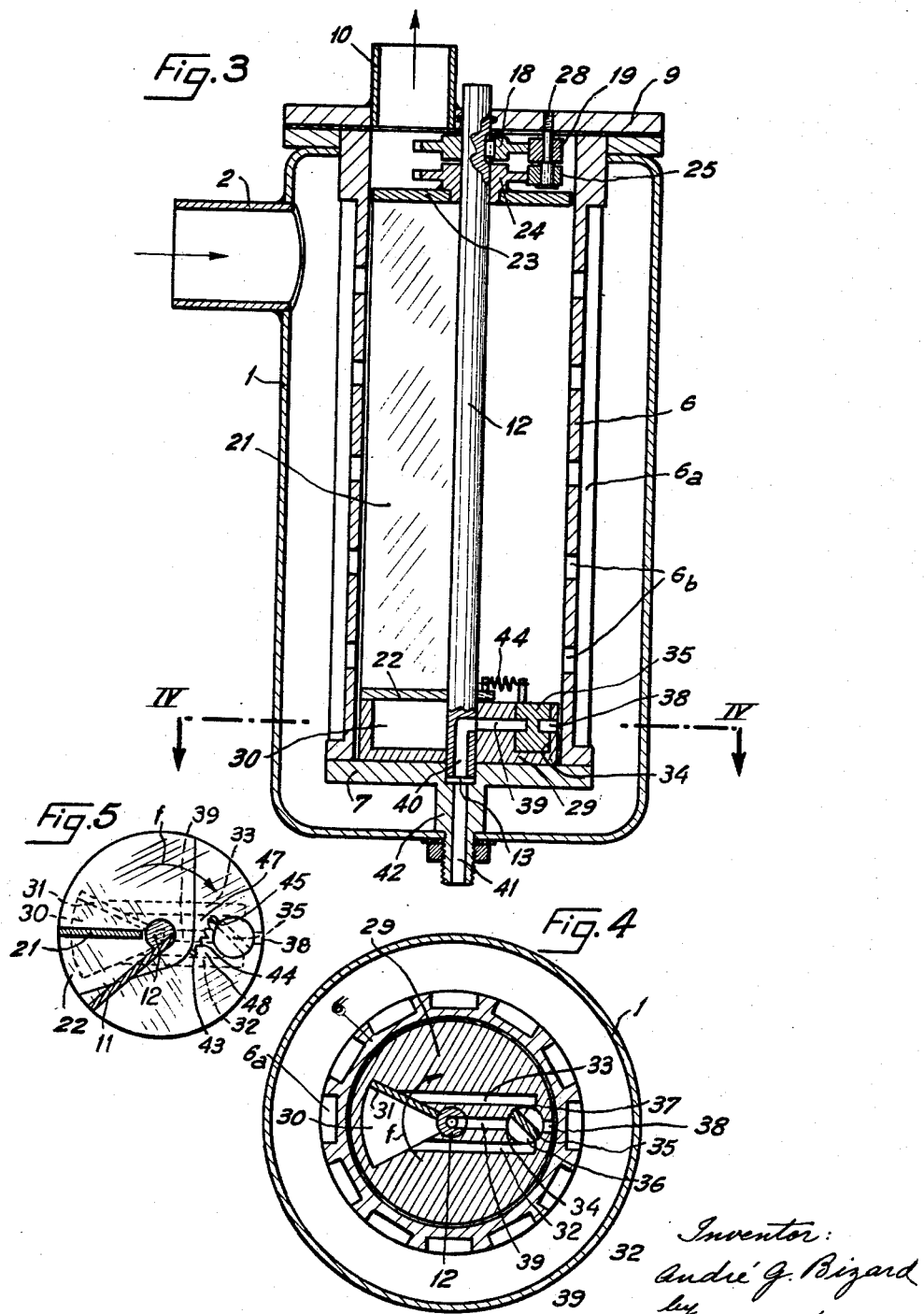

March 19, 1963

A. G. BIZARD 3,081,876

FILTER

Filed Oct. 6, 1959

Inventor:
André G. Bizard
by Robert Henderson
attorney

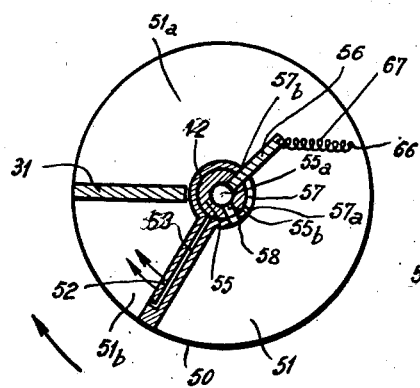
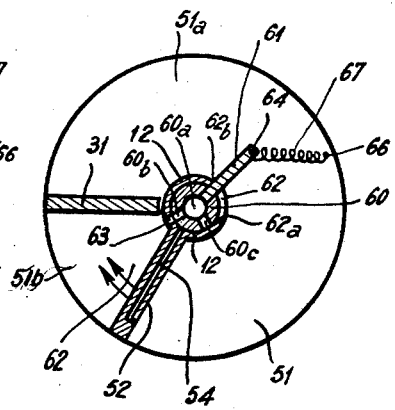
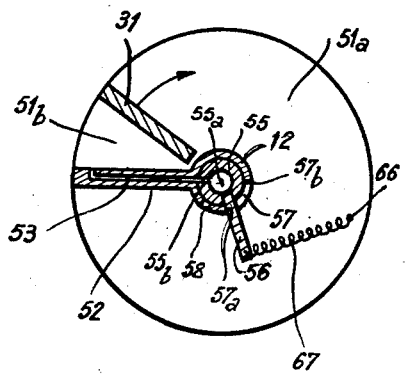
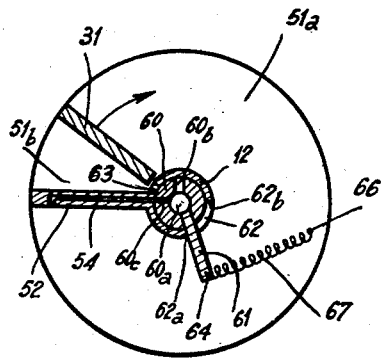

United States Patent Office 3,081,876
Patented Mar. 19, 1963

3,081,876
FILTER
André G. Bizard, Paris, France, assignor to Compagnie de Construction de Gros Material "Electro-Mecanique," Paris, France, a company of France
Filed Oct. 6, 1959, Ser. No. 844,667
Claims priority, application France Oct. 24, 1958
9 Claims. (Cl. 210—107)

This invention relates to filters and more particularly to means for cleaning filters during operation.

In some types of filters, in order to clean the filter surface during operation, a reverse flow of liquid is forced through the filter surface by means of a sort of reciprocating pump comprising a fixed vane and an oscillating vane situated within the cylindrical body of the filter. This type of pump only cleans one segment of the filter at a time and, so that the whole filtering surface can be cleaned, the movable vane is arranged to carry forward the body of the filter during its forward movement towards the fixed vane.

The disadvantage of this kind of filter is that the body of the filter has to be rotatably mounted and when it is desired to provide a very fine filter, for example by producing the filter surface by very closely winding a metal wire over the cylindrical body, one finds oneself unavoidably limited as regards the fineness of the filtration by the play which has to be provided between the co-axial surfaces of the cylindrical body and the casing in order to permit the rotation of the cylindrical body and, moreover, the impurities contained in the liquid to be filtered tend to lodge themselves between these co-axial surfaces.

Filters have been proposed having a fixed cylindrical body containing a rotary pump having paddles with an eccentric rotor but such filters are comparatively complicated and expensive.

The present invention relates to a filter having a fixed cylindrical body within which is mounted a pump comprising two vanes movable about an axis coinciding with that of the filter body, these vanes being mounted in such a manner that they can turn only in one and the same direction and means being provided for moving the vanes consecutively in such a manner that first the second vane is moved towards the first vane to force the liquid between the vanes through the filter surface against the normal flow, and then the first vane is moved away from the second vane a predetermined amount, the vanes thus reversing the flow to cleanse successive sectors of the filter surface.

Owing to the stationary mounting of the filter body the existence of any play is avoided and consequently an extremely fine filtration can be attained. Moreover it is no longer necessary to provide precision-machined co-axial surfaces, and the filter can accordingly be produced much more economically.

As compared with filters having paddle pumps, the construction is more robust and much simpler, the operation being moreover more reliable.

The drive of the cleansing pump may be carried out in any convenient manner, either manually or automatically.

In order that the invention may be more readily understood three embodiments will now be described in more detail by way of example reference being made to the accompanying drawings in which:

FIGURE 1 is an axial section of a filter according to the invention having a manual drive.

FIGURE 2 is a section on line II—II of FIGURE 1.

FIGURE 3 is a view analogous to FIGURE 1 of an embodiment of the filter having an automatic drive.

FIGURE 4 is a section on the line IV—IV of FIGURE 3.

FIGURE 5 is a view of a detail of FIGURE 3.

FIGURE 8 is a section on line VIII—VIII of FIGURE 6.

FIGURE 9 is a section on line IX—IX of FIGURE 6.

FIGURES 8a and 9a are respectively views corresponding to those of FIGURES 8 and 9, but in which the distributor mechanism occupies a different position.

Figure 6:
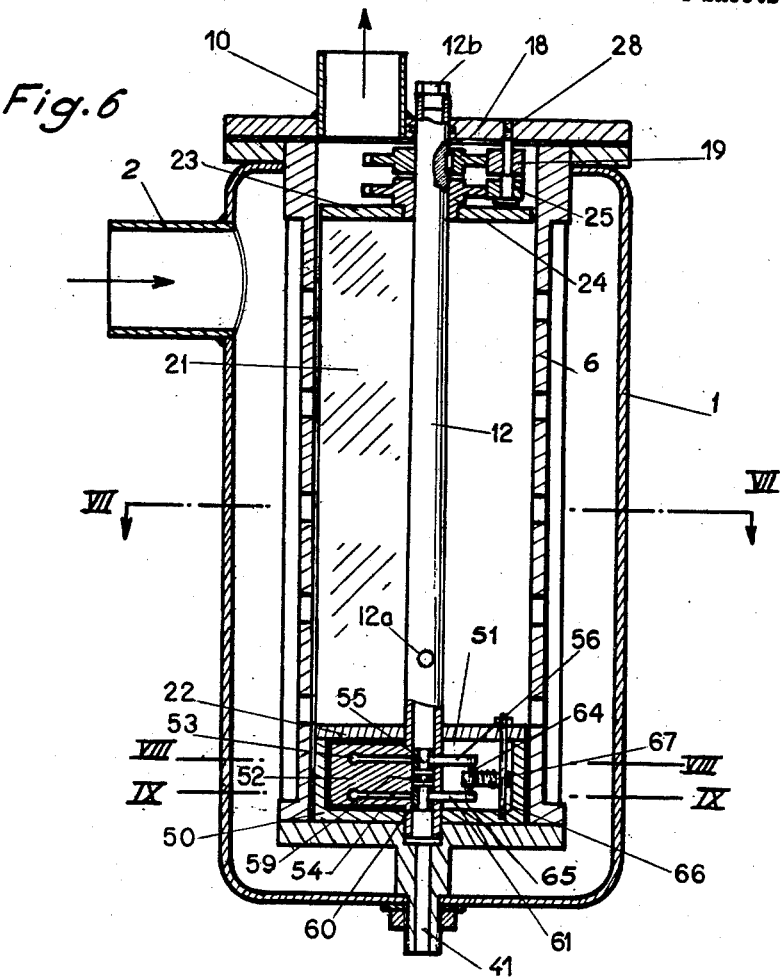
FIGURE 6 is an axial section of a second embodiment of a filter having an automatic drive.
Figure 7:
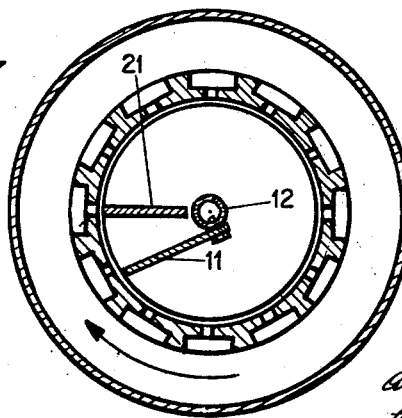
FIGURE 7 is a section on line VII—VII of FIGURE 6.

In the embodiment illustrated in FIGURES 1 and 2 the filter comprises a box or casing 1 provided with an inlet tube 2 and with a drain hole 3, normally closed by a plug 4.

The cylindrical filter body 6 is tightly fixed in a cover 5 of the casing 1.

This cylindrical body comprises in the present embodiment longitudinal ribs 6a designed to support the filter surface (not shown).

Holes 6b provided in the body 6 between the ribs 6a ensure communication between the interior and the exterior of the filter body.

At its lower end the cylindrical body 6 is closed by a plate 7, while at its upper end it comprises a flange 8 on which a closure plate 9 having an outlet tube 10 may be tightly fixed.

The reciprocating pump for cleansing the filter comprises a first radial vane 11 fixed to a rotatable shaft 12 mounted with its lower end in a bearing bore 13 in the plate 7 and with its upper end held in a sleeve 17 passing through the plate 9, in which it may turn. At its lower end the shaft 12 carries a ratchet wheel 18 constrained to turn with the shaft and associated with a pawl 19 mounted on the plate 7, in such a manner that this shaft can be turned only in the direction of the arrow $f$ of FIGURE 2.

The upper end of the shaft 12 is provided with a hand lever 20 for turning the shaft, whereby to angularly move the vane 11 which is fixed to said shaft.

A second radial vane 21 is mounted between two plates 22 and 23, being connected rigidly to said plates. The plate 22 can turn freely in the interior of the filter body relatively to the shaft 12, and the plate 23 is fixed to the sleeve 17, i.e., the second vane 21, the sleeve 17 and the plates 22 and 23 constitute a unit which is rotatable about the shaft 12 and is movable angularly relatively to the first vane 11. The plate 23 has a port 23a in it remote from the vane 21.

The sleeve 17 is integral with a ratchet wheel 24 associated with a pawl 25 carried by the closure plate 9 in such a manner that the vane 21, like the vane 11, can turn only in the direction of the arrow $f$.

The sleeve 17 carries a hand lever 26 for turning the sleeve 17, whereby to angularly move the vane 21 which is fixed to said sleeve.

Between the radial vanes 11 and 21 a spring 27 is arranged designed normally to maintain the vanes spaced apart a certain amount, for example about 45°.

The functioning of the filter described hereinabove is as follows:

The liquid to be filtered, introduced through the inlet 2, passes through the filter surface, then flows through the holes 6b into the interior of the filter body 6, which it leaves through the port 23a and the outlet 10.

In order to cleanse the filter surface, the operator angularly moves hand levers 20 and 26 toward one another, in a pincer movement. The vane 21 remains stationary since the ratchet wheel mechanism 24—25 prevents it from turning, while the vane 11 turns in the sense of the arrow and forces the liquid situated in the sector between the two vanes back through the filter surface opposite to the normal flow of filtration. The impurities detach themselves from the surface and collect at the bottom of the casing 1 from where they can be removed by the aid of the drain hole 3.

As soon as the hand levers 20—26 are released, the spring 27 pushes the vane 21 away from vane 11 to its normal angular spacing from the latter vane, which is held stationary by the ratchet mechanism 18—19. Thus, each of the two vanes of the pump has turned through an angle equal to the normal offset angle of the vanes and the sector between the vanes is consequently situated opposite another sector of the filter surface. For the cleansing of the latter sector the described operation is repeated and thus by several such operations of the hand levers it is possible to cleanse the whole surface of the filter.

It is to be noted that the filter cleaning operation is in no way affected adversely by the separation of the vanes 11 and 21 under the influence of the spring 27 after each release of the handles 20 and 26 even though this separation does create a certain amount of suction. This will be readily apparent and easily understood by a consideration of the following. The vane assembly always rotates in the same direction about the axis of the screen of the filter. As a consequence, the sector of the screen through which the aforesaid suction acts at any given time is not the sector from which the impurities were just dislodged, but the next adjacent, as yet uncleaned, sector. Therefore, even if some of the impurities floating in the liquid are drawn toward the screen, they land on the uncleaned sector and not on the one which was just cleaned.

Moreover, it will be understood that at any given location in the casing 1 the quantity of impurities there situated and floating in the liquid within the casing occupies a relatively small volume. The pressure pulses created by the repeated approaching of the vane 11 toward the vane 21 are of considerable magnitude, however, and have a tendency to cause an agglomeration of those quantities of impurities subjected to said pulses. As the resultant masses of impurities become larger and heavier, they start to gravitate and fall to the bottom of the casing from where they can be removed at will.

The embodiment illustrated in FIGURES 3 to 5 is similar to the one described hereinabove, but comprises an automatic drive device for the cleansing pump.

The ratchet wheel 18 keyed to the shaft 12 of the vane 11 is here mounted under the closure plate 9 carrying the outlet 10, the pawl 19 being mounted on the said plate by an axle 28.

This axle carries also the pawl 25 co-operating with the ratchet wheel 24, which is fixed to the plate 23 integral with the vane 21.

At its lower end, the shaft 12 is keyed to a rotor body 29.

This rotor body 29 contains a fluid-pressure chamber 30 in the form of a sector wherein a flap 31 integral with the plate 22 fixed to the vane 21 can move, said plate ensuring the closure of the chamber 30.

On both sides of the shaft 12 ducts 32 and 33 are provided in the rotor body 29. These ducts afford fluid communication between opposite ends of the chamber 30 and a cylindrical bore 34 having therein a cock 35 having two opposite valving recesses 36 and 37 in juxtaposition to these ducts.

Moreover, the rotor body 29 is formed with a duct 38 connecting the bore 34 with the exterior of said rotor body (i.e., with the interior of the filter body 6), and a duct 39 connected between the bore 34 and a longitudinal duct 40 in the shaft 12. The duct 40 opens, at its lower end, into the bearing bore 13 in which the lower end of the shaft 12 is journaled and the bore 13 is connected to a suitable drain duct by a duct 41 provided in the tube 42 which forms an extension of the plate 7.

As shown in detail in FIGURE 5, the plate 22 has an integral arm 43 connected by a compression spring 44 to an eccentric nipple 45 of the cock 35, which is adapted to abut against one or the other of a pair of spaced stops 47 and 48 (not shown in FIGURE 3) arranged atop the rotor body 29, the stops thus controlling and defining the angular positions of the said cock in accordance with the movement of the vane 21 and plate 22 relative to the rotor body 29.

The functioning of the device just described is as follows:

The cock 35 is assumed to occupy the position illustrated in FIGURE 4, and the liquid passes from the interior of the filter body 6, through duct 38, thence through the valving recess 37 into the duct 33 and pushes upon the flap 31 in the direction of the wall of the chamber 30 opposite to that at which the duct 33 opens.

Since the flap 31 is integral with the plate 22 which is in turn integral with the vane 21 prevented by the ratchet mechanism 24—25 from turning, it is the rotor body 29 and accordingly the shaft 12 with the vane 11 which turns in the direction of the arrow $f$, toward vane 21, thereby effecting the desired reverse flow of liquid through the particular sector of the filter surface. This movement of the rotor body 29 is not inhibited by liquid previously in chamber 30, because such liquid is exhausted from said chamber through duct 32, valving recess 36, and ducts 39, 40, and 41.

The just-described rotation of the rotor body 29, in the direction of the arrow, produces by means of the arm 43 and of the spring 44 an inversion of the position of the cock 35, which puts the duct 32 in communication with the pressured duct 38 through valving recess 36, and at the same time the duct 33 is connected to the drain duct 39.

The flap 31 thereupon moves in the chamber 30 towards the wall of the latter into which opens the duct 33. Since the ratchet mechanism 18—19 prevents the shaft 12 and the rotor body 29 and vane 11 from turning in a direction opposite to that of the arrow $f$, the flap 31 and the vane 21 integral with it turns, thus re-establishing the initial angular offset between the vanes 11 and 21. The latter have nevertheless been shifted angularly relative to the filter surface, in the direction of the arrow $f$, to an extent equal to the angular offset between the vanes.

In the meantime the relative movement generated between the plate 22, which turns, and the rotor body 29, which remains stationary, produces a new inversion of the cock 35 through the intermediary of the spring 44, and the cycle described hereinabove repeats itself automatically as long as the filtration pressure is maintained.

It is to be noted that the filter cleaning device according to this embodiment of the invention employs an element of relatively small cross-sectional area, to wit the flap 31, as the motive means for two elements of relatively large cross-sectional area, to wit the vanes 11 and 21. This is rendered possible by virtue of the following. At all times, each of the vanes 11 and 21 is subjected at both of its opposite faces to the full pressure of the liquid being filtered. It will be clear, of course, that only a relatively small differential is required between the pressure on the liquid in the space between the vanes and the pressure on the liquid outside of the filter body to force the liquid from the said space through the filter screen. As a consequence, even a small force exerted on the vane 11 will suffice to achieve this differential and thus to permit the vane 11 to move toward the vane 21. Such a force is readily afforded by the flap 31 and rotor body 29, since the full pressure of the liquid being filtered acts on only one face of the flap (the upper face as seen in FIGURE 5) through duct 38, valving recess 37 and duct 33, while the other face of the flap (the lower face as seen in FIGURE 5) directed toward the interior of the chamber 30 is vented to the atmosphere through the duct 32, valving recess 36, and drain ducts 39 and 41. Merely by way of example, if the pressure of the liquid being filtered is 10 kg./cm.$^2$ gauge 142.2 p.s.i.g), the force acting to turn the rotor body 29 and the vane 11 is the product of this pressure and the area of the flap 31. The required increase in the pressure on the liquid between the vanes, however, may be as small as about 1% of the starting pressure, i.e. about 0.1 kg./cm.² (1.42 p.s.i.g.). Thus, even though the active surface area of the vane 11 is much greater than that of the flap 31, the force resulting from the large pressure differential acting on the flap 31 is sufficient to turn the rotor body 29 and the vane 11. In the same way, of course, the subsequent movement of the vane 21 away from the vane 11 is accomplished by the movement of the flap 31 when the full pressure is applied thereto at one face through the duct 38, valving recess 36 and duct 32, while the portion of the chamber bounded by the other face of the flap is vented to the atmosphere through the duct 33, valving recess 37, and drain ducts 39 and 41.

In the embodiment illustrated in the FIGURES 6, 7, 8, 8a, 9 and 9a the elements of the filter are essentially as those described with reference to the FIGURES 3 to 5.

The lower plate 22, rigidly attached to the vane 21 of the cleansing pump, comprises a radial flap 31 integral both with said plate and with a lower cup 50 forming with it a sealed circular chamber 51 through which passes the hollow shaft 12 which carries the first vane 11 (see FIGURE 7) of the pump.

The central bore of the shaft 12 communicates on the one hand through a port 12a with the interior of the filter body 6, and on the other hand at its lower portion with the drainage duct 41. The top end of the shaft is closed by a plug 12b.

In the interior of the chamber 51, constituted by the plate 22 and the cup 50, the shaft 12 carries a radial vane 52 which may slide between the top and bottom walls of the said chamber, in such a manner as to define in the latter, with the flap 31, two compartments of variable volume, one of which 51a is outside the vane and the flap, and the other 51b is included between these two members.

The vane 52 has in its upper portion a narrow radial duct 53 opening at one end in the face of the vane 52 facing toward the flap 31, i.e. in the compartment 51b, and at the other end, in the bore of the shaft 12.

Below this duct 53 there is provided a parallel duct 54 which opens at its outer end in the compartment 51a, its other end opening in the bore of the shaft 12.

In the interior of the shaft 12 opposite the duct 53 a first rotary distributor 55 is provided which has an axial bore 55a and a radial duct 55b (FIGURES 8 and 8a).

This distributor is provided with a radial rod 56 which can move in a peripheral slot 57 of the shaft 12 in such a manner that the radial duct 55b coincides with the duct 53 of the vane 52 when the rod 56 abuts one of the ends 57a of the slot 57 (FIGURE 8a), and that the same duct 55b coincides with a hole 58 of the shaft 12 issuing into the compartment 51a when the rod 56 abuts against the other end 57b of the slot (FIGURE 8).

Below the distributor a tight plug 59 is provided in the interior of the shaft 12 (FIGURE 6).

Below the plug 59 a second distributor 60 is provided opposite the duct 54 of the vane 52.

This distributor (FIGURES 9 and 9a) contains a central bore 60a communicating with two radial ducts 60b and 60c.

The distributor 60 is provided with a rod 61 which can slide in a peripheral slot 62 of the shaft 12, the rod 61 being parallel to the rod 56 of the distributor 55 of the slot 62, the latter being parallel and equal to the slot 57.

The arrangement is such that when the rod 61 abuts the end 62a of the slot 62, the duct 60c is in alignment with the duct 54 of the vane 52, and the duct 60b is masked by the shaft 12 (FIGURE 9a) while when this rod abuts the other end 62b of the said slot, the duct 60b is situated opposite the hole 63 of the shaft 12 opening into the compartment 51b, and the duct 60c is masked by the shaft 12 (FIGURE 9).

The arrangement is such that the two distributors 55 and 60 must move jointly. Accordingly, a cross pin or axle 64 extends between and is fixedly connected to the rods or arms 56 and 61. To this pin is articulated a connecting rod 65, which is in turn articulated to a pin or shaft 66 carried rigidly by the cup 50 and the plate 22, a compression spring 67 being slipped over the connecting rod 65 between the two pins 64 and 66, and the articulations of the connecting rod on these pins having sufficient play that the assembly may form a knuckle joint the middle position of which is in an unstable equilibrium situated in the radial plane passing through the axis of the shaft 12 and through that of the pin or shaft 66, while the two positions of stable equilibrium correspond to the rods 56 and 61 abutting the ends of the slots 57 and 62 respectively.

The functioning of the device just described is as follows:

As in the embodiments described before the flap 31 and the vane 52 cannot turn except in the clockwise sense owing to the presence of the ratchet mechanisms 18, 19 and 24, 25.

In the position illustrated in the FIGURES 8 and 9, the central bore of the shaft 12, which communicates with the liquid under pressure contained in the filter body through the port 12a (FIGURE 6), is put in connection with the compartment 51a of the chamber 51 through the distributor 55 (coincidence of the duct 55b with the hole 58) while the compartment 51b is connected to the drain duct 41 by the distributor 60 (coincidence of the duct 60b with the hole 63 (FIGURE 9).

The vane 52 is forced towards the flap 31, as indicated by the arrows, under the influence of the pressure prevailing in the compartment 51a.

Since the various passages available to the said liquid are comparatively wide and short, the movement of the vane 52 is sudden. Owing to this fact the vane 11, which is integral with the shaft 12 (FIGURE 7), moves rapidly towards the vane 21 and the reverse flow of the liquid through the corresponding sector of the filter surface is rapid and consequently very effective.

When the movement of the vane 52 and accordingly of the shaft 12 has been sufficient for the knuckle joint mechanism 64—67 to clear its position of unstable equilibrium, this mechanism brings the distributors into the position illustrated in the FIGURES 8a and 9a.

The compartment 51a is accordingly connected to the drain duct 41 through duct 54, while the compartment 51b is put in communication with the liquid from the filter body through duct 53.

Under the effect of this pressure, the flap 31 is moved apart from the vane 52 and moves in the direction of the arrow together with the components with which it is integral.

Considering that the ducts 53 and 54 are long and narrow, the movement of the flap 31 is comparatively slow. The vane 21 moves accordingly slowly away from the vane 11.

During the displacement of the flap 31 under the relative movement between the shaft 12 and the shaft 66, the knuckle joint mechanism clears its position of unstable equilibrium and restores the distributors to the position of the FIGURES 8 and 9; the cycle described recommences. The principles underlying the operation of this embodiment of the invention are, of course, the same as those set forth hereinbefore in connection with the embodiment of FIGURES 3 to 5 and thus need not be repeated at this point.

It is obvious that modifications may be applied to the embodiments described hereinabove, particularly by the substitution of technical equivalents, within the scope of the present invention.

What I claim is:

1. In a filter having a container provided with an inlet port through which a liquid to be filtered passes into said container and with an outlet port through which filtered liquid passes from said container, and a fixed cylindrical filter body disposed within said container and provided with a cylindrical filter surface through which the liquid to be filtered passes to the interior of said filter body, said outlet port being in communication with the interior of said filter body, and the lowermost portion of said container exteriorly of said filter body constituting a settling portion wherein filtered-out material may settle for subsequent removal; a filter-cleaning pump comprising two substantially coextensive radial vanes arranged within said filter body and normally spaced from one another circumferentially of said filter body, said vanes being mounted for rotary movement about an axis coinciding with that of said filter body, means operatively connected with said vanes for constraining the same to unidirectional rotation in the same sense about said axis, and means operatively connected with said vanes and responsive to the pressure and flow of the liquid being filtered for first moving one of said vanes toward the other vane and then said other vane away from said one vane a predetermined amount to reestablish substantially the original spacing between said vanes, whereby each approach of said one vane toward said other vane forces any liquid then disposed in the space between said vanes through said filter surface against the normal flow of liquid therethrough, thereby to clean the respective sector of said filter surface by forcing the filtered-out material off said surface, while each separation of said other vane from said one vane positions said pump opposite the next to be cleaned sector of said filter surface.

2. A filter according to claim 1, said means for constraining said vanes to unidirectional rotation comprising a pair of ratchet wheel and pawl mechanisms each connected to a respective one of said vanes.

3. A filter according to claim 1, said means for moving said vanes comprising a rotor body arranged within said filter body and provided with a sector-shaped chamber, said rotor body being integral with said one vane, a flap disposed within and extending across said chamber in said rotor body, said flap being integral with said other vane, said rotor body being provided with a pressure duct communicating with the interior of said filter body, said rotor body being further provided with a drain duct and with a pair of additional ducts communicating with said chamber at the opposite sides of said flap, and means supported by said rotor body and controlling the communication between said pressure duct and said additional ducts and between the latter and said drain duct, whereby the operation of said controlling means alternately places each of said additional ducts in communication with said pressure duct while simultaneously placing the other of said additional ducts in communication with said drain duct.

4. A filter according to claim 3, said controlling means comprising a rotary cock mounted within said rotor body, and means operatively connecting said rotary cock with said flap to ensure operation of said rotary cock in accordance with the relative movements of said flap and said rotor body.

5. A filter according to claim 4 said connecting means comprising an arm integral with said flap, a nipple eccentrically carried by said rotary cock, and a spring anchored at its opposite ends to said arm and said nipple.

6. A filter according to claim 1, said moving means comprising means constructed to effect rapid movement of said one vane toward said other vane, and means to effect a relatively slow movement of said other vane away from said one vane.

7. A filter according to claim 6, said moving means comprising: a hollow member disposed within said filter body and defining a sealed cylindrical chamber, said member being integral with said other vane, a hollow shaft extending axially through said member and said filter body and carrying said one vane, means mounting said shaft for rotation about its axis, a flap fixed to said member within the confines of said chamber and extending radially of the latter from the peripheral wall of said member substantially to said shaft, a vane element carried by said shaft within the confines of said chamber and extending substantially radially of the latter to said peripheral wall of said member, said vane element being normally spaced from said flap circumferentially of said chamber, said flap and vane element thus dividing said chamber into two sections, said shaft being provided with a radially extending passageway placing the interior of said shaft in communication with the interior of said filter body exteriorly of said chamber, and distributor means connected with said shaft within the confines of said chamber for alternately placing each of said sections of said chamber into communication with said filter body while simultaneously venting the other section.

8. A filter according to claim 7, said distributor means being mounted within said shaft, said shaft being provided with a plurality of relatively short and wide ducts extending radially of said shaft and communicating with said sections of said chamber to permit the liquid from said filter body when directed through said shaft by said distributor means to act against said vane element from one of said chamber sections while the other chamber section is vented so as to effect the sudden approach of said one vane toward said other vane, and said radial vane element being provided with a plurality of relatively long and narrow ducts extending through said vane element essentially radially of said shaft and communicating with said sections of said chamber to permit the liquid from said filter body when directed through said shaft by said distributor means to act against said flap from said other chamber section while said one chamber section is vented so as to effect the slow separation of said other vane from said one vane.

9. A filter according to claim 8, said distributor means comprising twin distributors, and a resilient knuckle joint device articulated between a part of said hollow member and both said distributors for effecting a joint shifting of the latter in response to the relative movements of said flap and vane element.

References Cited in the file of this patent
UNITED STATES PATENTS

| | | |
|---|---|---|
| 1,772,798 | Carlson | Aug. 12. 1930 |
| 2,202,191 | Cuno | May 28, 1940 |
| 2,338,418 | Forrest et al. | Jan. 4, 1944 |
| 2,338,419 | Forrest et al. | Jan. 4, 1944 |
| 2,367,935 | Franck | Jan. 23, 1945 |